United States Patent
Johansson

(10) Patent No.: US 6,814,112 B2
(45) Date of Patent: Nov. 9, 2004

(54) METHOD OF CONTROLLING PRESS POWER IN A LIMBING KNIFE ASSEMBLY IN A SINGLE-GRIP HARVESTER HEAD

(75) Inventor: Anders Johansson, Ryssby (SE)

(73) Assignee: Sp-Maskiner AB, Ljungby (SE)

( * ) Notice: Subject to any disclaimer, the term of this patent is extended or adjusted under 35 U.S.C. 154(b) by 69 days.

(21) Appl. No.: 10/380,849

(22) PCT Filed: Sep. 13, 2001

(86) PCT No.: PCT/SE01/01956

§ 371 (c)(1),
(2), (4) Date: Mar. 18, 2003

(87) PCT Pub. No.: WO02/23973

PCT Pub. Date: Mar. 28, 2002

(65) Prior Publication Data

US 2004/0099338 A1 May 27, 2004

(30) Foreign Application Priority Data

Sep. 22, 2000 (SE) ................................................ 0003381

(51) Int. Cl.⁷ ............................................. A01G 23/083
(52) U.S. Cl. ...................... 144/338; 144/343; 144/356; 144/391; 144/402
(58) Field of Search ................................. 144/335, 336, 144/338, 339, 343, 356, 391, 402, 419, 4.1, 34.1, 1.1, 34.5, 24.12; 83/370, 72, 74, 75

(56) References Cited

U.S. PATENT DOCUMENTS

| | | | | |
|---|---|---|---|---|
| 3,938,566 A | * | 2/1976 | Penfold et al. | ............. 144/391 |
| 4,164,246 A | * | 8/1979 | Savage et al. | ............. 144/34.5 |
| 4,898,218 A | | 2/1990 | Linderholm | |
| 5,441,090 A | * | 8/1995 | Hill et al. | .................... 144/4.1 |
| 6,041,683 A | * | 3/2000 | Timperi et al. | ................ 83/76 |

* cited by examiner

Primary Examiner—Allen Ostrager
Assistant Examiner—Shelley Self
(74) Attorney, Agent, or Firm—Harness Dickey

(57) ABSTRACT

In a method, when using a single-grip harvester head for felling and processing trees, of controlling the press power which, by means of a limbing knife assembly (6), is exerted on a stem (3) which is horizontally fed through th head with its butt end first, the diameter of the stem is measured and the press power is reduced in accordance with a control diagram as the diameter decreases during the feeding. The measured diameter values are registered, and each measured diameter value is compared with a predetermined diameter value which is selected from the diameter values of the stem (3) which are previously registered during the feeding of the stem. If a measured diameter value is found to equal or be greater than this predetermined diameter value, the press power is increased to a corrective power value, which is maintained until a later measured diameter value falls below a reference value.

8 Claims, 2 Drawing Sheets

METHOD OF CONTROLLING PRESS POWER IN A LIMBING KNIFE ASSEMBLY IN A SINGLE-GRIP HARVESTER HEAD

FIELD OF THE INVENTION

The present invention relates to a method,
when using a single-grip harvester head for felling and processing trees, which head has a frame mounted on a forest machine and defines an essentially horizontal tree feeding path, two rotatable feeding rollers which are arranged on either side of said path and adapted to grip and to feed along the feeding path a stem, and at least one limbing knife assembly which is adapted to limb a stem which in an essentially horizontal position to which it is elevated by the head is fed by the feeding rollers along said path with its butt end first, the limbing knife assembly comprising an upper knife and two lower knives which are each pivotable about an axis, being essentially parallel to said path, in order to press, from below, by means of a controllable press power, the stem against a fixed support and together with the upper knife enclose the stem,
of controlling said press power,
in which method the diameter of the stem is measured during the feeding of the stem and the press power is reduced in accordance with a predetermined control diagram as the diameter decreases during the feeding, the diameter of the stem being measured indirectly by measuring the pivoting position of at least one of the two pivotable knives.

BACKGROUND ART

In a single-grip harvester head of the type described above, in which the pivotable limbing knives, which are hydraulically driven, press the stem against the upper limbing knife which here forms the fixed support, the press power generated by the pivotable knives must be greater, the heavier the stem. In order to control this, the diameter of the stem is measured continuously and the hydraulic pressure is controlled by means of control and computer equipment in such a manner that the press power increases the greater the diameter of the stem, i.e. the press power exerted on one and the same stem during its feeding is reduced as the stem is being fed. It is essential that the press power is not made too great since an increased press power results in increased friction between the limbing knives and the stem and, thus, in the strain on the feeding rollers increasing as the tree feeding power increases. For this reason it is thus essential that the measuring of the diameter can be carried out in an accurate way. Accurate measuring of the diameter is essential also because the optimisation of the marking of the stem for cross-cutting calculated by the computer equipment is based exactly on the diameter of the stem. Accurate measuring of the diameter requires that the stem during the measuring is correctly placed in the nip between the limbing knives, i.e. abuts properly against the support formed by the upper, fixed limbing knife. However, this is not always the case since the pivotable limbing knives sometimes tend to "spring" back to some extent as a result of the weight of the stem. The pivotable limbing knives can also "spring" back or be opened as a consequence of a tree, which is essentially horizontally placed in the single-grip harvester head, during processing being stuck in, for example, another tree or the driver of the forest machine on which the head is mounted not being flexible enough in his or her manoeuvring of the head relative to the tree or the stem.

SUMMARY OF THE INVENTION

The object of the present invention is to provide a method of controlling the press power generated by the pivotable limbing knives in such a manner that the pivotable limbing knives are safely brought back to a "closed" position as soon as they "spring" back.

According to the invention, this object is achieved by a method which is of the type stated by way of introduction and is characterised in
that the diameter values which are measured by degrees during the measuring of the diameter are registered,
that each measured diameter value is compared with a predetermined diameter value being selected from the diameter values of the current stem which are previously registered during the feeding of the stem,
that, if a measured diameter value is found to equal or be greater than this predetermined diameter value, the press power is increased to a corrective power value which is considerably higher than the press power value which, according to the predetermined control diagram, corresponds to this measured diameter value, and
that this corrective power value is maintained until a later measured diameter value falls below a reference value which is somewhat greater than or equals said predetermined diameter value,
after which the press power is once again controlled in accordance with the predetermined control diagram.

Preferably, the corrective power value equals or is greater than the value of the press power which, in accordance with the control diagram, is exerted on the stem where its diameter is at its maximum.

The predetermined diameter value preferably equals the lowest registered diameter value of the current stem.

Preferably, the reference value equals said predetermined diameter value.

BRIEF DESCRIPTION OF THE DRAWINGS

The invention will now be described in more detail with reference to the accompanying drawings.

DESCRIPTION OF A PREFERRED EMBODIMENT

Figure 1:
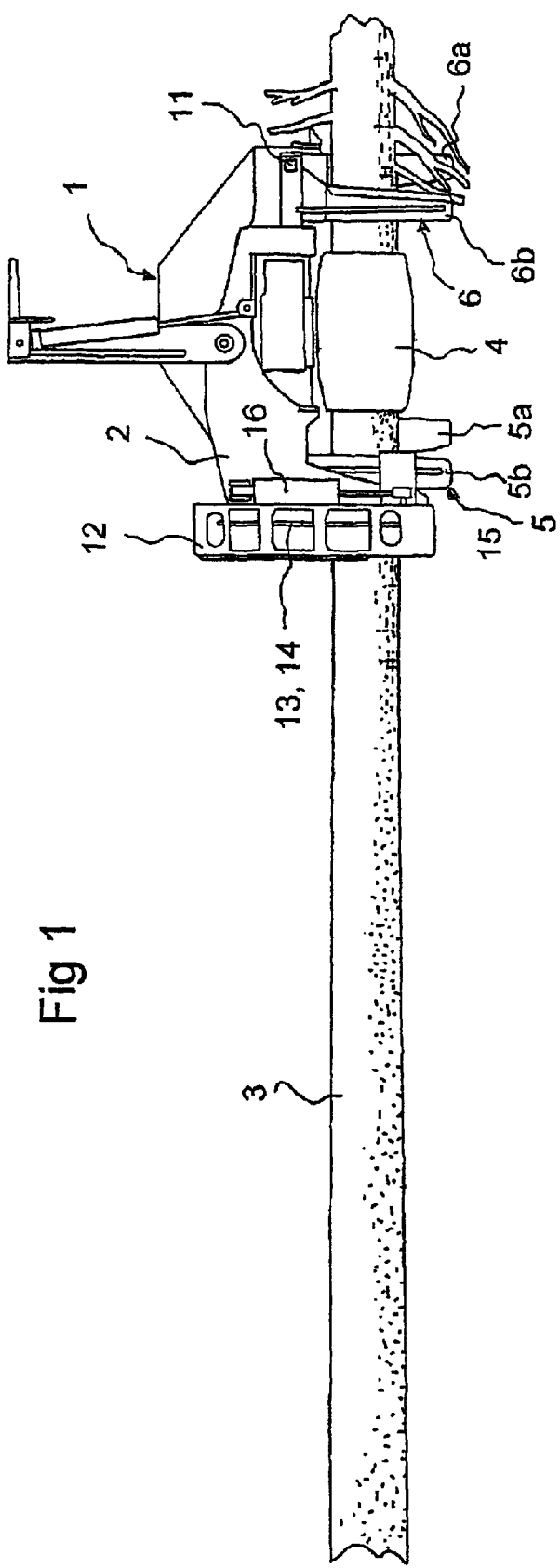
FIG. 1 shows a single-grip harvester head during the processing of a tree.

The single-grip harvester head 1 shown in FIG. 1 is adapted to fell and process trees and has a frame 2 by means of which the head is mounted on a forest machine (not shown). The frame 2 defines a tree feeding path, i.e. a path along which a felled tree 3 is fed through the head 1 for processing. This path is essentially horizontal when the single-grip harvester head 1 is in its processing position, as shown in FIG. 1.

In addition, the single-grip harvester head 1 has two rotatable feeding rollers 4 which are arranged on either side of the tree feeding path and of which feeding rollers only one is visible in FIG. 1 and which are movable towards and away from the tree feeding path in order to grip and feed along this path trees having varying stem diameters.

The single-grip harvester head 1 has also two limbing knife assemblies 5 and 6 which are arranged at a distance from one another along the tree feeding path. Each assembly 5 and 6 has three knives, of which one is fixed and two are movable and which together enclose the stem 3.

Figure 2:
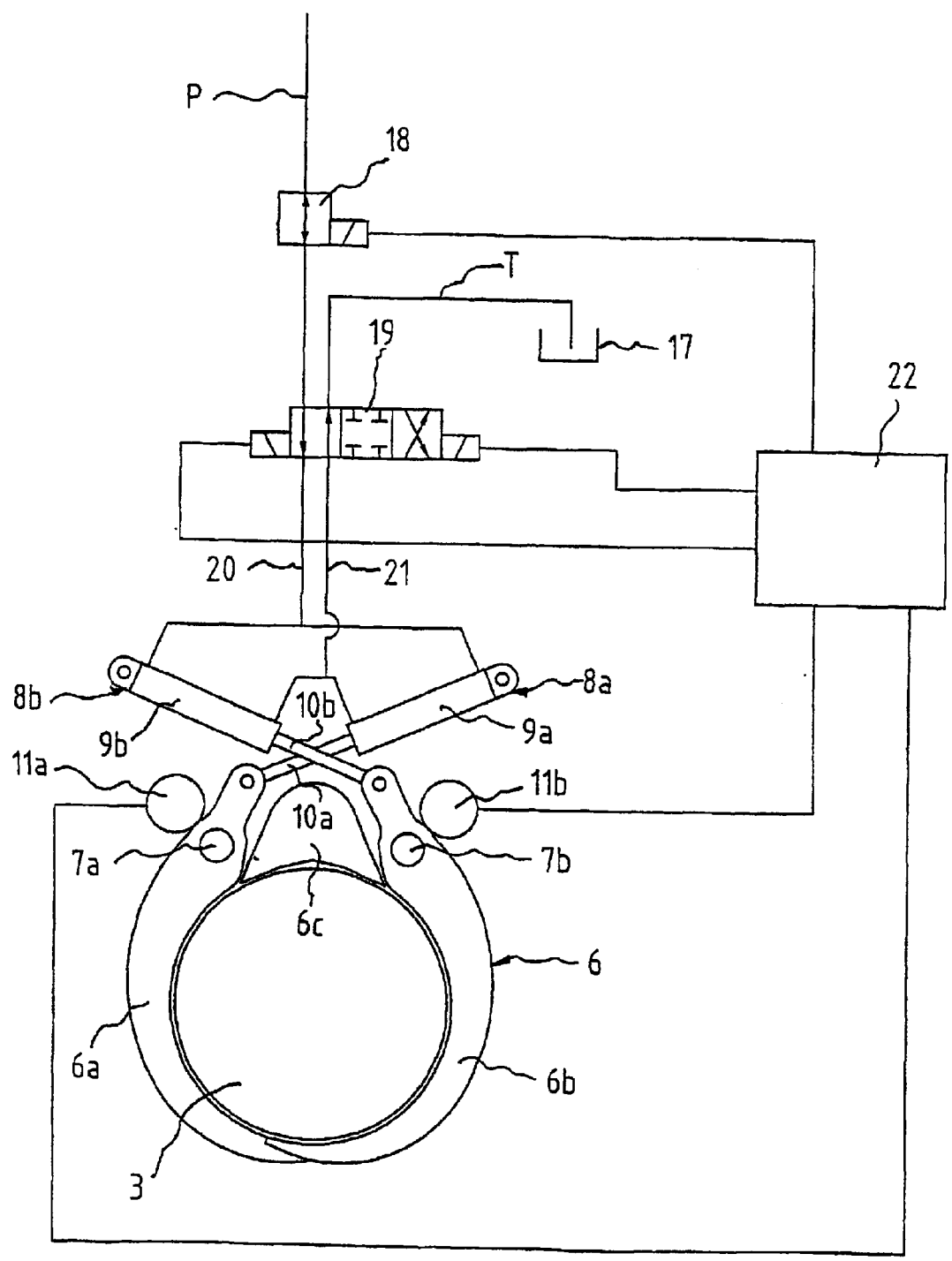
FIG. 2 shows a limbing knife assembly and circuits arranged for controlling the same.

The limbing knife assembly 6 which is shown to the right in FIG. 1, i.e. located nearest to the top of the tree 3, and which has movable knives 6a and 6b and a fixed, upper knife 6c is shown in more detail in FIG. 2. The movable knives 6a and 6b are each pivotable about an axis 7a and 7b, respectively, which is parallel to the tree feeding path, in order to press, from below, the stem 3 against the fixed knife 6c forming a fixed support, and together with the fixed knife enclose the stem. The movable knives 6a and 6b are pivotable by means of one double-acting hydraulic cylinder assembly 8a and 8b each, the cylinder 9a and 9b, respectively, of which is articulated to the frame 2 and the piston rod 10a and 10b, respectively, of which is articulated to the knife 6a and 6b, respectively. The movable knives 5a and 5b in the limbing knife assembly 5 shown to the left in FIG. 1 are pivotable in the same way by means of one hydraulic cylinder assembly each. The movable knives 5a and 5b are thus pivotable in the same manner as the movable knives 6a and 6b.

The limbing knife assembly 6 has a measuring means 11 for measuring the diameter of the stem 3 which is fed through the single-grip harvester head 1. The measuring means 11 consists of a pulse generator 11a and 11b which is arranged on each of the two movable knives 6a and 6b, respectively, of the limbing knife assembly 6, and indirectly measures the diameter of the stem 3 by measuring the pivoting position of the movable knives 6a and 6b.

The single-grip harvester head 1 also has a sawing device 12. The sawing device 12 has a guide bar 13 which is connected to the frame 2 for pivoting about an axis parallel to the tree feeding path. The guide bar 13 supports a saw chain 14 which is mounted thereon and which is driven by a hydraulic motor 15 arranged on the frame 2. The guide bar 13 is by means of a double-acting hydraulic cylinder assembly 16 pivotable between an upper starting position, in which the guide bar 13 is located above the stem 3 which is to be cut off and a lower end position, in which the saw chain 14 has cut off the thickest stem that can be processed by means of the single-grip harvester head 1, i.e. a position in which the guide bar 13 is located a distance below this stem.

In FIG. 2, P designates the outgoing conduit from a hydraulic pump (not shown) which is driven by a diesel engine (not shown) which also drives the forest machine on which the single-grip harvester head 1 is mounted. T designates a conduit leading to a tank 17.

The conduit P is via an electrically controlled pressure regulating valve 18 connected to an electrically controlled multipath valve 19. The conduit T is also connected to the valve 19. One chamber of the hydraulic cylinders 8a and 8b is connected to the valve 19 via a system of conduits 20, and their second chamber is connected to the valve 19 via a system of conduits 21. The hydraulic cylinder assemblies which are connected to the knives 5a and 5b in the limbing knife assembly 5 are connected to the systems of conduits 20 and 21 in the same manner as the hydraulic cylinder assemblies 8a and 8b. A control computer 22 is connected to the valves 18 and 19 in order to control them. The pulse generators 11a and 11b are connected to the control computer 22.

The valve 19 can take three different positions, namely a first position shown in FIG. 2, in which the conduit P communicates with the system of conduits 20 and the conduit T communicates with the system of conduits 21, a second position, in which the conduit P communicates with the system of conduits 21 and the conduit T communicates with the system of conduits 20, and a third position, in which all these connections are broken.

When using a single-grip harvester head 1, a stem 3 is fed through the head by means of the feeding rollers 4. The stem 3 is fed with its butt end first, i.e. in such a manner that its diameter in the area of the measuring means 11 is continuously decreasing. The stem 3 is pressed against the fixed knives in the two limbing knife assemblies 5 and 6 by the movable knives 5a, 5b and 6a, 6b, respectively. The three knives in each limbing knife assembly 5 and 6 together enclose the stem 3 in order to limb it during its feeding. The press power which is exerted on the stem 3 by the movable limbing knives 5a, 5b and 6a, 6b is reduced as the stem is being fed and thus its diameter decreases.

The control computer 22, which during the feeding of the stem 3 keeps the valve 19 in its first position (FIG. 2), receives the measuring signals of the pulse generators 11a and 11b which signals indicate the pivoting position of the movable knives 6a and 6b and controls, depending on these measuring signals, which are converted by the control computer 22 to measured diameter values of the stem 3, the pressure regulating valve 18 in order to reduce the press power in accordance with a predetermined control diagram. The diameter values which are measured by degrees are registered by the control computer 22, possibly after a predetermined time delay which, for example, corresponds to the time required for transferring a point on the stem 3 from the measuring means 11 to the guide bar 13.

The control computer 22 compares every measured diameter value with a predetermined diameter value being selected from the diameter values of the stem 3 which are previously registered during the feeding of the stem being processed. This predetermined diameter value here equals the lowest registered diameter value of the stem 3 being processed. If the movable knives 6a and 6b, which are provided with the pulse generators 11a and 11b, for some reason are slightly opened and, thus, do not press the stem 3 properly against the fixed knife 6c or even risk being opened to such a degree that the stem 3 can fall to the ground, the measuring signals generated by the pulse generators correspond to a diameter value of the stem which is greater than the lowest registered diameter value of this stem 3. By controlling the pressure regulating valve 18, the control computer 22 then increases the press power exerted by the movable knives 5a, 5b and 6a, 6b to a corrective power value which is considerably higher than the press power value which according to the predetermined control diagram corresponds to this measured diameter value of the stem. The corrective power value here equals or is greater than the value of the press power which, in accordance with the control diagram, is exerted on the stem 3 where its diameter is at its maximum. The corrective power value is maintained until a later measured diameter value of the same stem 3 falls below a predetermined reference value which is somewhat greater than or equals the predetermined diameter value. Subsequently, the press power is once again controlled in accordance with the control diagram.

What is claimed is:

1. A method, when using a single grip harvester head for felling and processing trees, which head has a frame mounted on a forest machine and defines an essentially horizontal tree feeding path, two rotatable feeding rollers which are arranged on either side of said path and adapted to grip and to feed along the feeding path a stem, and at least one limbing knife assembly which is adapted to limb a stem which in an essentially horizontal position to which it is elevated by the head is fed by the feeding rollers along said path with its butt end first the limbing knife assembly comprising an upper knife and two lower knives which are each pivotable about an axis, being essentially parallel to said path, in order to press, from below, by means of a controllable press power, the stem against a fixed support and together with the upper knife enclose the stem, of controlling said press power,
in which method the diameter of the stem is measured during the feeding of the stem and the press power is reduced in accordance with a predetermined control diagram as the diameter decreases during the feeding,
the diameter of the stem being measured indirectly by measuring the pivoting position of at least one of the two pivotable knives,
wherein the diameter values which are measured by degrees
during the measuring of the diameter are registered,
that each measured diameter value is compared with a predetermined diameter value being selected from the diameter values of the current stem which are previously registered during the feeding of the stem,
that, if a measured diameter value is found to equal or be greater than this predetermined diameter value, the press power is increased to a corrective power value which is considerably higher than the press power value which, according to the predetermined control diagram, corresponds to this measured diameter value, and that this corrective power value is maintained until a later measured diameter value falls below a reference value which is somewhat greater than or equals said predetermined diameter value,
after which the press power is once again controlled in accordance with the predetermined control diagram.

2. A method as claimed in claim 1, wherein said corrective power value equals or is greater than the value of the press power which, in accordance with the control diagram, is exerted on the stem where its diameter is at its maximum.

3. A method as claimed in claim 1, wherein said predetermined diameter value equals the lowest registered diameter value of th current stem.

4. A method as claimed in claim 1, wherein said reference value equals said predetermined diameter value.

5. A method as claimed in claim 2, wherein said predetermined diameter value equals the lowest registered diameter value of the current stem.

6. A method as claimed in claim 2, wherein said reference value equals said predetermined diameter value.

7. A method as claimed in claim 3, wherein said reference value equals said predetermined diameter value.

8. A method as claimed in claim 5, wherein said reference value equals said predetermined diameter value.

* * * * *